United States Patent Office 3,036,065
Patented May 22, 1962

3,036,065
DIOXO-AZETIDINES
Ernst Jucker, Binningen, Basel-Land, Anton Ebnöther, Erwin Rissi, and Arnold Vogel, Basel, and Roy Steiner, Pfeffingen, Basel-Land, Switzerland, assignors to Sandoz Ltd., Basel, Switzerland
No Drawing. Filed Apr. 25, 1960, Ser. No. 24,258
Claims priority, application Switzerland Apr. 28, 1959
7 Claims. (Cl. 260—239)

The present invention relates to therapeutically valuable dioxo-azetidines and more especially to 1 - [1' - di (lower)alkylamino - (lower)alkyl] - (lower)alkylcarbonylamino-3,3-di(lower)alkyl-2,4-dioxo-azetidines.

The new azetidines of the present invention correspond to the formula

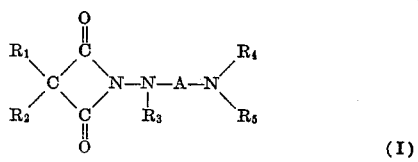

wherein each of $R_1$, $R_2$, $R_4$ and $R_5$ is a lower alkyl group (e.g. methyl, ethyl, propyl, isopropyl, butyl, isobutyl, etc.), $R_3$ is a lower aliphatic acyl group (i.e. lower alkylcarbonyl) such as propionyl, butyryl, etc., but preferably acetyl, and A is a lower alkylene bridge which may be straight-chained or branch-chained, e.g. —$CH_2CH_2$—, $CH_2CH_2CH_2$—, —$CH_2CH_2CH_2CH_2$—

—$CH_2CH_2CH_2CH_2CH_2$—

—$CH_2CH_2CH_2CHCH_2$—
           |
           $CH_3$ etc.

The azetidines of Formula I are conveniently prepared by reacting a hydrazine derivative of the formula

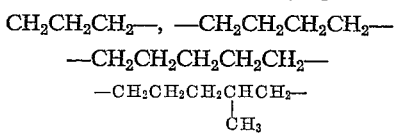

wherein $R_3$, $R_4$ and $R_5$ have the previously-recited significances, with a malonic acid halide of the formula

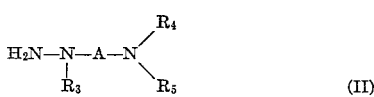

wherein $R_1$ and $R_2$ also have the previously-recited significances, and Hal stands for Cl or Br.

In carrying out the process of the preceding paragraph, a one-sided disubstituted hydrazine derivative II, e.g. 1 - (β - diethylaminoethyl) - 1 - acetyl - hydrazine, in solution in an anhydrous organic solvent, such as chloroform, methylene chloride, trichlorethylene, tetrahydrofurane, etc., is added dropwise and while cooling the reaction mixture, to a solution of a disubstituted malonic acid halide III, a tertiary base such e.g. as triethylamine being added to the mixture to bind liberated HCl, and the reaction mixture being allowed to stand at room temperature (about 20° to about 30° C.) for a period of time so that the reaction may go to completion. The desired end-product I can be recovered from the reaction mixture e.g. by evaporation of the latter, followed by purification of the obtained residue by fractional distillation. The so-obtained dioxo-azetidines I are basic compounds which form stable salts with organic and inorganic acids, such salts being crystalline at room temperature. Thus, therapeutically acceptable non-toxic addition salts are formed with a wide variety of acids such for example as hydrohalic acids (e.g. hydrochloric acid, hydrobromic acid, etc.), phosphoric acid, sulfuric acid, acetic acid, citric acid, benzoic acid, methane-sulfonic acid, tartaric acid, etc.

The hydrazine derivatives of Formula II used as starting materials are known and can be prepared in a variety of ways as described in the copending U.S. patent application, Ser. No. 829,544. According to the latter these hydrazine derivatives can e.g. be prepared by reacting an acid hydrazide with an aliphatic oxo-compound characterized by alkaline substitution, the resultant acyl hydrazone being then reduced to give the acylated hydrazine. Thus, for example, acetic acid hydrazide is reacted with e.g. dialkylamino acetone by heating a solution thereof in an organic solvent such e.g. as ethanol. Reduction of the reaction product can be effected with the aid of catalytically active hydrogen, using e.g. a nickel or platinum catalyst.

The compounds I of the present invention and their salts constitute a new class of compounds which, because of their excellent pharmacodynamic properties and their very low toxicity, are highly suitable for therapeutic use. In animal tests they exhibit a strong antiphlogistic action. In the rat, they inhibit edema formation following subcutaneous administration of formalin. The new compounds show an analgetic action. In view of their properties, the new compounds are useful in the treatment and relief of chronic rheumatism, chronic rheumatic polyarthritis, and arthritic processes in general, e.g. rheumatoid arthritis, more especially for the relief of inflammation due to such conditions. The new compounds may be administered orally or by injection.

In the following examples which represent presently preferred illustrative embodiments of the invention, the parts and percentages are by weight unless otherwise indicated. The relationship between parts by weight and parts by volume is the same as that between grams and milliliters. Temperatures are in degrees centigrade; melting points and boiling points are uncorrected.

Example 1

A solution of 9.1 parts of 1-(1'-dimethylaminopentyl-4')-1-acetyl-hydrazine in 50 parts by volume of absolute trichlorethylene is stirred dropwise at 0–10° into a solution of 9.6 parts of diethylmalonyldichloride in 50 parts by volume of absolute trichlorethylene, and then 13.7 parts by volume of triethylamine are dropped in at the same temperature. The mixture is stirred for 3½ hours at room temperature, and the precipitated triethylamine-hydrochloride filtered off and washed with trichlorethylene. The filtrate is shaken thoroughly with ice-cold aqueous potassium hydroxide solution of 25% strength, and the organic phase separated, dried over sodium sulfate and evaporated. The resultant residue is fractionally distilled, the desired 1 - (1' - dimethylamino-pentyl-4')-acetylamino-3,3-diethyl-2,4-dioxo-azetidine having a boiling point of 149–151° under a pressure of 0.1 mm. Hg.

The base forms a fumarate with fumaric acid, the salt—crystallized from ethanol-ether—having a melting point of 130–131° (decomposition).

Example 2

A solution of 13.6 parts of 1-(1'-dimethylaminobutyl-3')-1-acetyl-hydrazine in 50 parts by volume of absolute trichlorethylene is stirred dropwise at 0–10° into a solution of 15.5 parts of diethylmalonyldichloride in 75 parts by volume of absolute trichlorethylene, after which 22 parts by volume of triethylamine are also added dropwise at the same temperature. The mixture is then stirred for 3½ hours at room temperature, and the precipitated triethylamine-hydrochloride filtered off and washed with trichlorethylene. The filtrate is shaken thoroughly with ice-cold aqueous potassium hydroxide solution of 25% strength, and the organic phase separated, dried over sodium sulfate and evaporated. The resultant residue is fractionally distilled twice, the desired 1-(1'-dimethylamino - butyl - 3') - acetylamino - 3,3 - diethyl - 2,4 - dioxo-azetidine distilling as a colorless oil at 122–125° under a pressure of 0.01 mm. Hg; $n_D^{26}$=1.4727. The IR-spectrum of the compound shows at 1890 and 1756 cm.$^{-1}$ the bands which are typical for azetidine-2,4-diones.

Example 3

A solution of 11.2 parts of 1-(1'-diethylaminobutyl-3')-1-acetyl-hydrazine in 50 parts by volume of absolute trichlorethylene is stirred dropwise at 5° into a solution of 11.9 parts of diethylmalonyl-dichloride in 70 parts by volume of absolute trichlorethylene, after which 16.9 parts by volume of triethylamine are added dropwise at the same temperature. After stirring the reaction mixture for four more hours at room temperature, the precipitated triethylamine-hydrochloride is filtered off and washed with trichlorethylene. The filtrate is shaken thoroughly with ice-cold aqueous potassium hydroxide solution of 25% strength, and the organic phase separated, dried over sodium sulfate and evaporated. The resultant residue is fractionally distilled, the desired 1-(1'-diethylamino-butyl-3')-acetylamino-3,3-diethyl-2,4-dioxo-azetidine distilling over as a yellow oil at 137–139° under a pressure of 0.01 mm. Hg. For purification, the oil is re-distilled and the desired compound collected; B.P. 146–148°/0.1 mm. Hg; $n_D^{23}$=1.4740.

Example 4

A solution of 1-(2'-diethylamino-4'-methyl-pentyl)-1-acetyl-hydrazine in 40 parts by volume of absolute trichlorethylene, and then 7.9 parts by volume of triethylamine, are stirred dropwise and while cooling the reaction mixture, into a solution of 5.65 parts of diethyl-malonyldichloride in 30 parts by volume of absolute trichlorethylene. The mixture is stirred for 3½ hours at room temperature, and the precipitated triethylamino-hydrochloride filtered off and washed with tri-chlorethylene. The filtrate is shaken thoroughly with ice-cold aqueous potassium hydroxide solution of 25% strength, and the organic phase separated, dried over sodium sulfate and evaporated. The resultant residue is distilled, the fraction going over at a bath temperature of 110–170° under a pressure of 0.03 mm. Hg being collected and re-distilled. The desired 1-(2'-diethylamino-4'-methyl-pentyl)-acetylamino-3,3-diethyl-2,4-dioxo-azetidine is collected at B.P. 124–125°/0.02 mm. Hg. The IR-spectrum of the compound shows at 1760 cm.$^{-1}$ the band which is typical for azetidine-2,4-diones.

Example 5

A solution of 2.45 parts of 1-(β-diethylaminoethyl)-1-acetyl-hydrazine in 15 parts by volume of absolute trichlorethylene, and then 3.9 parts by volume of triethylamine, are stirred dropwise at 5° into a solution of 2.79 parts of diethylmalonyldichloride in 15 parts by volume of absolute trichlorethylene. The mixture is stirred for 3 hours at room temperature, and the precipitated triethylamine-hydrochloride filtered off and washed with trichlorethylene. The filtrate is shaken thoroughly with ice-cold aqueous potassium hydroxide solution of 25% strength, and the organic phase separated, dried over magnesium sulfate and evaporated. The resultant residue is distilled. The desired 1-(β-diethylamino-ethyl)-acetylamino-3,3-diethyl-2,4-dioxo-azetidine distills over at a bath temperature of 120–140° under a pressure of 0.02 mm. Hg. For purification, it is twice re-distilled at a bath temperature of 90–110° at a pressure of 0.03 mm. Hg. The IR-spectrum of the compound shows at 1890 and 1756 cm.$^{-1}$ the bands which are typical for azetidine-2,4-diones.

Example 6

A solution of 8.79 parts of 1-dimethylamino-isopropyl-1-acetyl-hydrazine in 50 parts by volume of absolute trichlorethylene, and then 15.2 parts by volume of triethylamine, are stirred dropwise at 0–10° into a solution of 10.9 parts of diethylmalonyldichloride in 50 parts by volume of absolute trichlorethylene. The mixture is stirred for 3 hours at room temperature, and the precipitated triethylamine-hydrochloride filtered off and washed with trichlorethylene. The filtrate is shaken thoroughly with ice-cold aqueous potassium hydroxide solution of 25% strength, and the organic phase separated, dried over magnesium sulfate and evaporated. The residue from the evaporation is distilled three times at a bath temperature of 110–120° and a pressure of 0.05 mm. Hg, the desired 1-(1'-dimethylaminopropyl-2')-acetylamino-3,3-diethyl-2,4-dioxo-azetidine being obtanied as a light yellowish oil. The IR-spectrum of the compound shows at 1890 and 1758 cm.$^{-1}$ the bands which are typical for azetidine-2,4-diones.

Example 7

A solution of 4.05 parts of 1-diethylamino-isopropyl-1-acetyl-hydrazine in 40 parts by volume of absolute trichlorethylene, and then 6 parts by volume of triethylamine, are stirred dropwise at 0–5° into a solution of 4.26 parts of diethylmalonyldichloride in 25 parts by volume of absolute trichlorethylene. The mixture is stirred for 3 hours at room temperature, and the precipitated triethylamine-hydrochloride filtered off and washed with trichlorethylene. The filtrate is shaken thoroughly with ice-cold aqueous potassium hydroxide solution of 25% strength, and the organic phase separated, dried over magnesium sulfate and evaporated. The resultant residue is twice distilled, whereupon the desired 1-(1'-diethylamino-propyl - 2') - acetylamino - 3,3 - diethyl - 2,4 - dioxo - azetidine passes over at a bath temperature of 110–120° and a pressure of 0.05 mm. Hg. The IR-spectrum of the compound shows at 1890 and 1756 cm.$^{-1}$ the bands which are typical for azetidine-2,4-diones.

Example 8

A solution of 9.73 parts of 1-[1'-(N-methyl-N-isopropyl)-amino-butyl-3']-1-acetyl-hydrazine in 44 parts by volume of absolute trichlorethylene, and then 10.7 parts of triethylamine, are stirred dropwise at 5° into a solution of 10.38 parts of diethyl-malonyldichloride in 61 parts by volume of absolute trichlorethylene. The mixture is stirred for 4 more hours at room temperature, and the precipitated triethylamine-hydrochloride filtered off and washed with trichlorethylene. The filtrate is shaken thoroughly with ice-cold aqueous potassium hydroxide solution of 25% strength, and the organic phase separated, and dried over magnesium sulfate. After removal of the solvent, the residue is distilled under reduced pressure, the desired 1-[1'-(N-methyl-N-isopropyl)-amino-butyl-3']-acetylamino-3,3-diethyl-2,4-dioxo-azetidine being obtained at 170–180°/0.3 mm. Hg.

The hydrochloride of the base is obtained by passing hydrogen chloride into an ether solution of the base. The hydrochloride melts at 156–157° after recrystallization from absolute ethanol-ether.

Corresponding compounds can be obtained if the starting compound of this example is replaced by a compound wherein the acetyl group is replaced by another alkylcarbonyl group, as e.g. the propionyl group whereby the product is the 1-[1'-(N-methyl-N-isopropyl)-amino-butyl-3']-propionylamino-3,3-diethyl-2,4-dioxo-azetidine.

Having thus disclosed the invention, what is claimed is:

1. A member selected from the group consisting of the compounds of the formula

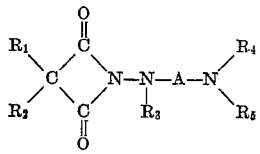

and the non-toxic acid addition salts thereof, wherein each of $R_1$, $R_2$, $R_4$ and $R_5$ is lower alkyl, $R_3$ is lower alkylcarbonyl, and A is lower alkylene.

2. 1-(1'-dimethylamino-pentyl-4')-acetylamino-3,3-diethylamino-2,4-dioxo-azetidine.
3. 1-(1'-dimethylamino-butyl-3')-acetylamino-3,3-diethyl-2,4-dioxo-azetidine.
4. 1-(1'-diethylamino-butyl-3')-acetylamino-3,3-diethyl-2,4-dioxo-azetidine.
5. 1-(β-diethylamino-ethyl)-acetylamino-3,3-diethyl-2,4-dioxo-azetidine.
6. 1-(1'-dimethylamino-propyl-2')-acetylamino-3,3-diethyl-2,4-dioxo-azetidine.
7. 1-(1'-diethylamino-propyl-2')-acetylamino-3,3-diethyl-2,4-dioxo-azetidine.

References Cited in the file of this patent

Ebnother et al.: Helvetica Chimica Acta, vol. 42, No. 3 (1959), pp. 948–955.